United States Patent Office 3,637,616
Patented Jan. 25, 1972

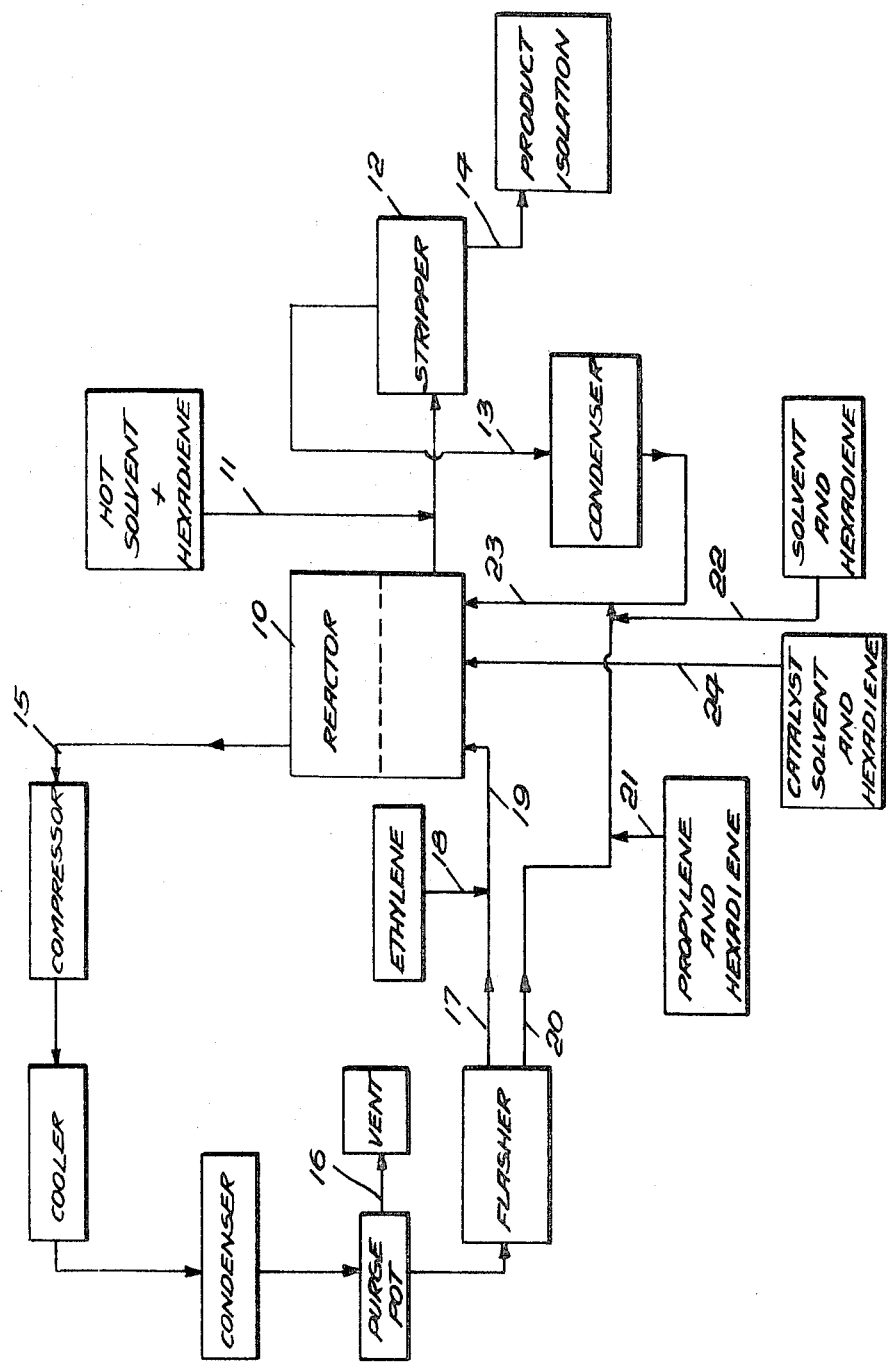

3,637,616
ETHYLENE COPOLYMERIZATION PROCESS
Robert E. A. Petersen, Wilmington, Del., assignor to E. I.
du Pont de Nemours and Company, Wilmington, Del.
Filed Aug. 15, 1967, Ser. No. 660,687
Int. Cl. C08f 15/40
U.S. Cl. 260—80.78                               11 Claims

ABSTRACT OF THE DISCLOSURE

In the copolymerization of ethylene with an α-olefin, such as propylene, in a solvent, e.g., n-hexane, reactor fouling due to high ethylene-content polymer formation can be reduced by feeding ethylene to the reactor both as a vapor and a liquid, the ratio of liquid propylene to liquid ethylene maintained high enough to form solvent-soluble copolymer.

BACKGROUND OF THE INVENTION

This invention relates to the polymerization of ethylene and, more particularly, to improvements in the copolymerization of ethylene with other α-olefins in solution.

The polymerization of ethylene with one or more α-olefins such as propylene in solution using coordination catalyst systems is well known in the art. When conducted as a continuous process, one obtains an ethylene copolymer, dissolved in the solvent, which is continuously removed and isolated by one of the various means known to those skilled in the art. Unreacted monomers leaving the reactor are recovered and recycled to the reactor along with fresh monomers to make up for those consumed by the polymerization reaction. Owing to their different reactivity ratios, the monomers polymerize in solutions of coordination catalyst systems at different rates. For example, to obtain a copolymer of ethylene and propylene having approximately 50 mole percent of each monomer in the copolymer, one must have a large excess of propylene, e.g., greater than 10:1 mole ratio, dissolved in the catalyst-containing reactor solution. If one attempted to conduct a copolymerization in a solution containing about equal amounts of ethylene and propylene, the copolymer prepared would be extremely high in ethylene content and would not be soluble in saturated hydrocarbon solvents at ordinary polymerization conditions.

In the vapor space above the polymerization reactor, the mole ratio of propylene to ethylene will be far less than the propylene to ethylene mole ratio in the liquid phase because of the greater volatility of ethylene. For example, if the propylene to ethylene mole ratio in the liquid phase is about 10:1, the propylene to ethylene mole ratio in the vapor phase above it may be only about 2 or 3:1. It is known in the art to cool such polymerization reactors by the evaporation and/or removal from solution of the excess unreacted monomers which are withdrawn from the vapor space, cooled and recycled to the reactor.

The polymer solution withdrawn from the liquid phase of the reactor contains unreacted monomers. These are stripped from the polymer solution and also recycled to to the reactor.

From the above description, it is obvious, therefore, that in a typical continuous solution polymerization process for copolymerizing ethylene and propylene, monomers are introduced into the reactor from three sources: (a) fresh or makeup monomers in the ratio that they occur in the polymer being produced, e.g., having a propylene to ethylene (P/E) mole ratio of 1:1 or less; (b) recycle monomers taken from the vapor space above the reactor which may have a P/E mole ratio of about 2:1; and (c) recycle monomers stripped from the polymer solution leaving the reactor which typically have a P/E mole ratio of at least about 10:1. The volumes of these streams are such that the recycle monomer from the vapor space over the reactor will usually be so large, particularly when combined with the makeup monomer stream, that the total P/E mole ratio being introduced into the reactor is usually much less than 5:1 and sometimes even as low as 1:1. If streams of such low P/E ratio are condensed and cooled or absorbed in solution such that they are introduced into the reactor entirely in the liquid phase, copolymers with a very high ethylene content will form on contacting the catalyst at the points of introduction into the reactor. As previously stated, such high ethylene-containing copolymers are generally insoluble in the solvent and their presence will cause a very undesirable amount of reactor fouling.

If these monomers are introduced into the reactor entirely in the vapor or gaseous phase, reactor fouling will be reduced; however, it will not be possible to cool the reactor as efficiently and catalyst efficiency will be greatly reduced due to the low rate of solubility of the monomers into the reaction mass.

Another apparent solution to this problem is to provide extremely high agitation in the reactor such that the incoming liquid monomers will be rapidly dispersed into the liquid phase before substantial amounts of high ethylene-content polymer can form. This is not a practical solution to the problem because of the extraordinary energy requirements and the fact that even using high agitation the fouling problem is not completely eliminated.

Still another apparent solution to the problem lies in running the reactor at extremely low conversions so that the recycle streams when combined with makeup monomer yield a high P/E mole ratio. However, this is actually a step backward in the art since such low conversions represent an inefficient and uneconomic process.

SUMMARY OF THE INVENTION

In the process of preparing hydrocarbon-soluble copolymers by copolymerizing ethylene and propylene with a coordination catalyst in a hydrocarbon solvent in a reactor having a vapor phase and a liquid phase, the improvement of introducing ethylene into said reactor both as a vapor and as a liquid together with liquid propylene in amounts wherein the ratio of liquid propylene to liquid ethylene is high enough to form solvent-soluble copolymer when contacting said catalyst in said reactor.

BRIEF DESCRIPTION OF DRAWING

The drawing illustrates a flowsheet of a preferred embodiment of the invention which is described in detail in the example.

DETAILED DESCRIPTION OF THE INVENTION

The improvement obtained by this invention is generally applicable to the copolymerization of ethylene with one or more other lower α-olefins such as propylene or 1-butene. Small proportions of one or more other monomers can also be present; for example, it is a preferred embodiment of this invention to have non-conjugated hydrocarbon dienes of from about 5 to 22 carbon atoms present during the copolymerization process in amounts up to as high as about 3 weight percent based on total solution. Representative dienes are 1,4-hexadiene, dicyclopentadiene, 5-methylene-2-norbornene, 5-ethylidene-2-norbornene and 1,5-cyclooctadiene. The general preparation of such polymers is set forth in U.S. patents to Gresham et al., 2,933,480; Tarney, 3,000,866; Gladding et al., 3,063,973, and 3,093,-620; Gladding 3,093,621; Adamek et al., 3,211,709; and Natta et al., 3,260,708 and 3,300,459.

Typically, the polymers produced by the process will be copolymers of ethylene containing from about 20% to 60% propylene but will preferably contain from about 30% to 50% propylene, by weight.

The invention will usually be found to be valuable when the polymerization is conducted in a hydrocarbon solvent because of the great tendency for objectionably high ethylene-content polymers to be insoluble therein. The invention is particularly valuable when the polymerization is conducted in saturated linear hydrocarbons containing from about 5 to 8 carbon atoms such as hexane, pentane and heptane.

The polymerization process is conducted in a coordination catalyst system of the types now well known to those skilled in the art and which are described in detail in the U.S. patents referred to above. It should be noted that for each different catalyst combination a different P/E mole ratio in the solution is required to yield a given propylene content in the polymer. Consequently, each catalyst system will also have a certain lower limit on P/E mole ratio in the solution at which polymer will begin to form sufficiently high in ethylene content to be insoluble in the solvent. Specifically to be mentioned are the catalyst systems using vanadium tris(acetylacetonate), hereinafter VAA, and diisobutyl aluminum monochloride, hereinafter DIBAC, as well as the system using vanadium tetrachloride, hereinafter $VCl_4$, and DIBAC. In using such catalysts, suitable aluminum to vanadium (Al/V) ratios and amounts of catalyst employed per liter of total solution will depend on the specific compounds and conditions employed. These are well known to those skilled in the art, e.g., as set forth in the above patents. Frequently, Al to V ratios will fall within the range from 2:1 to 20:1. Likewise, the amount of catalyst expressed as the amount of vanadium content frequently ranges from about 0.00001 to 0.002 mole per liter.

Coordination catalyst compositions can be employed which contain compounds which enhance their activity, such as benzotrichloride, hexachloropropene, and the like. In using those compositions the Al/V ratio may be greatly increased and the vanadium concentration greatly reduced. See, for example, DeJong et al. U.S. Pat. 3,072,630, Nakaguchi et al. U.S. Pat. 3,328,366 and Christman, U.S. Pat. 3,301,834.

The temperature at which the polymerization reactor is operated will, of course, have some effect on the maximum amount of ethylene which can be tolerated in the polymer without becoming insoluble. Generally, the higher the temperature, the more likely high-ethylene content polymers are to be soluble in the solvent. While the polymerization reactor can be operated satisfactorily at temperatures ranging from about −20° C. to 80° C., it is preferred that the reaction be conducted within the range of about 20° C. to 50° C. Within these ranges the invention is very advantageous.

The essence of the invention has been described as feeding ethylene to the reactor both as a vapor and as a liquid in such amounts that the ratio of liquid propylene to liquid ethylene being fed to the reactor is high enough to produce a soluble polymer. The upper limit on P/E molar ratio in the liquid feed is not critical insofar as the elimination of insoluble polymer is concerned; it will not be higher than the P/E ratio in the reactor liquid phase. A practical determination of the minimum P/E ratio employable in the liquid phase fed to the reactor under a given set of conditions can be made by setting up the continuous process with the desired amount of recycle of monomers etc. and running it with increasing P/E ratios in the liquid feed to determine at which point substantial fouling is eliminated. The invention is very advantageous when employed in a process where the vapor phase in the reactor has a P/E molar ratio of less than about 4:1.

The invention may be carried out in practice in various ways. One technique can be referred to as partial condensation. In this embodiment, the vaporized monomers leaving the reactor are combined with the monomers stripped from the product stream and the makeup monomers to form a composite mixture which has, for example, a P/E mole ratio of about 3:1. This mixture is then compressed and cooled so as to partially condense the monomers. Because of the lower volatility of propylene, the initial portions of the condensate will be rather high in propylene content and thus have a P/E mole ratio of, for example, greater than 5 or 6:1.

Another embodiment for carrying out the invention is referred to as partial absorption. In this embodiment, the recycled monomers are combined as described above, compressed and cooled somewhat, and then contacted in an absorber with a stream containing makeup monomers (of the type being fed to the reactor) under compression conditions such that only a portion of the monomers is absorbed in the solvent in the resulting two-phase system. As before, the portion of the monomers absorbed will have a higher P/E mole ratio than the mixture of monomers in the vapor state and feeding all components to the reactor will appropriately apportion the ethylene between the vapor and liquid phases.

A third embodiment for carrying out the invention is partial flashing. As before, all the monomers being fed to the reactor are combined, but in this embodiment all are compressed and cooled so as to completely condense the mixture of monomers. Thereafter, the monomers which are now essentially all in the liquid state are partially flashed so as to produce a portion of the monomer mixture in the gaseous state. The latter will be relatively rich in ethylene owing to its greater volatility and, again, the unflashed liquid will have a relatively high P/E mole ratio. The amount of flashing can be controlled to give a P/E ratio as high as needed to prevent reactor fouling, e.g., greater than 5 or 6:1.

To reduce the gas volume and thus the load on the compressor and condenser system, the embodiments of partial condensation and partial flashing can be combined. Such an embodiment is described in great detail in the following example wherein parts and percentages are by weight unless otherwise specified and reference is made therein to the accompanying drawing.

Example

A reactor 10 for the continuous solution copolymerization of ethylene, propylene and 1,4-hexadiene is operated at 30° C., 35.6 p.s.i.g., and a residence time of about 30 minutes. The reactor has a vapor or gas phase above a liquid phase. At equilibrium, the weight ratio of propylene to ethylene in the liquid phase is approximately 15:1 and the weight ratio of n-hexane solvent to propylene is approximately 14:1. The coordination catalyst is formed by pre-mixing of VAA with DIBAC. A liquid stream is continuously removed from the liquid phase of reactor 10 and combined with a solvent and 1,4-hexadiene stream 11 at a temperature of about 185° C. and 70.6 p.s.i.g. and introduced into a stripper 12. The overhead vapor stream 13 from the stripper containing chiefly volatile materials is condensed at a pressure of 45.6 p.s.i.g. and −15° C. and fed into the reactor 10 as shown. The liquid stream 14 from the stripper is sent for further processing into conventional product isolation steps indicated on the drawing. Typical operation of the process yields about 25 parts per hour of a terpolymer of about 60.7% ethylene, 36% propylene and 3.3% 1,4-hexadiene having a Mooney viscosity (ML–4/250° F.) of about 60.

The overhead vapor phase stream 15 from the reactor 10 containing chiefly unpolymerized ethylene and propylene plus hexane and lesser amounts of other volatile materials is fed into a compressor where it is compressed to about 400 p.s.i.g. From there it is sent to a cooler and a condenser wherein the temperature is brought down to about −15° C. The stream is then passed through a purge pot where some of the uncondensed gases 16 are removed in order to hold the inerts down to a reasonable level and from there it is passed through a letdown device where it adiabatically flashes to −44° C. at 45.6 p.s.i.g. The gas phase stream 17 from the flasher is combined with a gaseous ethylene stream 18 at −15° C. at 45.6 p.s.i.g. and fed into the reactor through stream 19. The liquid phase stream 20 from the flasher is combined with a stream 21 which is predominantly propylene and 1,4-hexadiene also maintained at about −15° C. at 45.6 p.s.i.g.; this liquid stream is further combined with a stream 22 that is predominantly hexane solvent and 1,4-hexadiene. As illustrated, these streams are combined with stream 13 after it passes through a condenser and are introduced into the reactor 10 through stream 23. As will be seen from the quantities to be set forth hereinafter, the molar ratio of propylene to ethylene in liquid stream 23 entering the reactor is about 6:1. Through a stream 24, the VAA and DIBAC catalyst components are introduced in a solution of hexane containing methylene chloride together with some 1,4-hexadiene.

In Table I, the parts (per 25 parts of polymer produced) of each of the principal constituents of the streams are set forth (rounded off to three significant figures).

TABLE I

| Constituent | Stream reference number | | | | | | | | | | |
|---|---|---|---|---|---|---|---|---|---|---|---|
| | 11 | 13 | 14 | 15 | 16 | 18 | 19 | 21 | 22 | 23 | 24 |
| Hydrogen | 0 | 0.0001 | 0 | 0.0709 | 0.0014 | 0.0014 | 0.0704 | 0 | 0 | 0.0006 | 0 |
| Nitrogen | 0.0118 | 0.0266 | 0.0002 | 3.90 | 0.0527 | 0 | 3.75 | 0 | 0.0343 | 0.159 | 0.0068 |
| Methane | 0 | 0.0019 | 0 | 0.147 | 0.0009 | 0.0009 | 0.132 | 0 | 0 | 0.0172 | 0 |
| Ethane | 0 | 0.741 | 0.0682 | 12.0 | 0.0154 | 0.0049 | 4.94 | 0.0787 | 0 | 7.88 | 0 |
| Ethylene | 0 | 0.726 | 0.0468 | 17.2 | 0.0307 | 15.2 | 24.7 | 0.0394 | 0 | 8.5 | 0 |
| Propane | 0 | 1.92 | 0.529 | 10.9 | 0.0041 | 0 | 1.07 | 0.533 | 0 | 12.3 | 0 |
| Propylene | 0 | 9.38 | 2.12 | 63.0 | 0.0274 | 0 | 7.13 | 11.1 | 0 | 76.4 | 0 |
| Hexane | 32.5 | 19.8 | 171 | 16.7 | 0.0001 | 0 | 0.0045 | 0 | 111 | 147 | 27.7 |
| Hexadine | 0.207 | 0.161 | 1.20 | 0.143 | 0 | 0 | 0.0001 | 0.935 | 0.704 | 1.94 | 0.176 |
| CH$_2$Cl$_2$ | 3.59 | 11.4 | 19.5 | 16.4 | 0.0007 | 0 | 0.0876 | 0 | 12.2 | 39.9 | 3.72 |
| VAA | 0 | 0 | 0.0537 | 0 | 0 | 0 | 0 | 0 | 0 | 0 | 0.0537 |
| DIBAC | 0 | 0 | 0.2182 | 0 | 0 | 0 | 0 | 0 | 0 | 0 | 0.2182 |
| Polymer | 0 | 0 | 25.0 | 0 | 0 | 0 | 0 | 0 | 0 | 0 | 0 |

Alternative embodiments to the above example can employ the addition of makeup monomers at some point prior to the flasher; moreover, the effluent from the flasher can be fed via a single stream containing both phases to the reactor, if desired. Such modifications will, of course, alter the compositions of the various streams indicated in Table I.

If the catalyst system of the above example is changed to replace VAA with VCl$_4$, the P/E ratio in stream 23 may be lowered to about 4.5 to 1 before substantial fouling due to insoluble polymer occurs.

The invention enables the preparation of ethylene, propylene copolymers, whose utility as valuable elastomers is well known, by an improved process which affords good reaction temperature control and materials handling with a minimum of reactor fouling. Polymer of excellent quality can be produced with good catalyst efficiency.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. In the process of preparing hydrocarbon-soluble copolymers by copolymerizing ethylene and propylene with a coordination catalyst in a hydrocarbon solvent at about −20° C. to about 80° C. in a reactor having a vapor phase and a liquid phase, the improvement of introducing as a feed to the reactor ethylene both as a vapor and as a liquid together with liquid propylene in amounts wherein the ratio of liquid propylene to liquid ethylene in the feed is high enough that the copolymer formed when the feed contacts the catalyst in the reactor is soluble in the hydrocarbon solvent.

2. A process as defined in claim 1 wherein said solvent is a saturated linear hydrocarbon of about 5 to 8 carbon atoms.

3. A process as defined in claim 1 wherein said copolymers contain from about 20 to 60 percent propylene by weight.

4. A process as defined in claim 1 wherein part of the ethylene and propylene monomers introduced into said reactor are unpolymerized monomers recycled to said reactor.

5. A process as defined in claim 1 wherein a small proportion of a non-conjugated hydrocarbon diene is present in said process.

6. In the process of preparing hydrocarbon-soluble copolymers by copolymerizing ethylene and propylene with a vanadium coordination catalyst in a saturated linear hydrocarbon solvent of about 5 to 8 carbon atoms in a reactor having a vapor phase where the ratio of propylene to ethylene is less than about 4 to 1 and a liquid phase wherein the temperature is in the range of about −20° C. to 80° C., and recycling unpolymerized monomer from the vapor phase and liquid phase to said reactor together with fresh ethylene and propylene, the improvement of introducing as a feed to the reactor ethylene both as a vapor and as a liquid together with liquid propylene in amounts wherein the ratio of liquid propylene to liquid ethylene in the feed is high enough that the copolymer formed when the feed contacts the catalyst in the reactor is soluble in the hydrocarbon solvent.

7. A process as defined in claim 6 wherein recycle ethylene and propylene is condensed to a liquid phase and partially flashed to a vapor phase having a higher ratio of ethylene before introduction into said reactor.

8. A process as defined in claim 6 wherein said copolymer contains from about 30 to 50 percent propylene by weight.

9. A process as defined in claim 6 wherein a small proportion of a non-conjugated hydrocarbon diene monomer is present in said process.

10. A process as defined in claim 6 wherein the vanadium component of the catalyst is vanadium tris(acetylacetonate) or vanadium tetrachloride.

11. A process as defined in claim 10 wherein the temperature of the reactor liquid phases is in the range of about 20° C. to 50° C.

References Cited

UNITED STATES PATENTS 2,484,384  10/1949  Levine _____ 260—683.15
3,260,708  7/1966  Natta _____ 260—79.5

FOREIGN PATENTS 486,980  6/1938  Great Britain _____ C8—3 F
826,053  12/1969  Great Britain _____ P7—1 D JOSEPH L. SCHOFER, Primary Examiner
R. S. BENJAMIN, Assistant Examiner U.S. Cl. X.R.
260—88.2